April 30, 1968 L. H. WHEELER 3,381,084

COLOR TELEVISION CAMERA OPTICAL SYSTEM

Filed June 1, 1964

INVENTOR.
LIONEL H. WHEELER

BY

ATTORNEYS

United States Patent Office 3,381,084

Patented Apr. 30, 1968

3,381,084

COLOR TELEVISION CAMERA OPTICAL SYSTEM

Lionel H. Wheeler, Glendale, Calif., assignor, by mesne assignments, to Mannie Feigenbaum Filed June 1, 1964, Ser. No. 371,287
6 Claims. (Cl. 178—5.4)

This invention relates to color television and more particularly relates to an optical system for a color television camera.

In color television cameras, a plurality of color separation images of a given subject are formed, the separate images generally containing the blue, red and green wave band of light. The separate images might also include one or more black and white renditions of the same subject. The separate images are then directed onto the faces of suitable television cameras, such as vidicon tubes, orthicon tubes, or the like. Many varied optical systems have been proposed for forming the various separation images, but the systems with the highest commercial acceptance have generally utilized some form of dichroic beam splitter inserted in a single incoming beam of light.

The most satisfactory dichroic beam splitters for this use take the form of a pair of dichroic mirrors positioned between the taking lens and the television camera tubes. The first mirror reflects a first spectral region of light, generally that containing the blue wave length band, and transmits the remainder of the light. The blue image thus formed is directed by suitable optics to a first of the television camera tubes. The light transmitted through the first dichroic mirror is then directed onto a second dichroic mirror which reflects a second spectral region of light, generally red, and transmits a third spectral region, green. The red image is directed to a second television camera tube and the green image is directed to a third camera tube. Dividing the beam in this manner has been found to be highly efficient as there is no appreciable diminution of light intensity, and the images formed are quite selective of the proper wave lengths.

Problems arising from the use of such a beam splitting and image forming system are primarily of a practical nature. In the construction of color television cameras, as in any other camera, it is desired to utilize space as economically as possible to facilitate easy handling. The camera must also be designed, if possible, to permit the use of an optical system which provides sufficient image brightness for the cameras without requiring an inordinately high subject light level. It is desired, then, that the lenses of the system have a low $f/$-number.

Such has not been possible in prior systems. In one of the most prominent of these systems, an identical pair of lens systems is provided between the subject image formed by the taking lens and the television camera tubes. The first of these lens systems is focused on the subject image and the second, reversed as to the first, is focused on the camera tubes. The dichroic mirrors are positioned between the second system and the camera tubes. Since the beam splitting system physically takes up a certain amount of space, the focal length of the second lens system must be relatively long, as must that of the first, the systems being identical to preserve a 1:1 copy ratio.

Since $f/$-number of a lens system is defined as the ratio of the focal length to the lens diameter, it can be seen that the system described above is faced with a dilemma. Since the focal length must of necessity be long, in order to have a low $f/$-number of the diameter of the lens must be large. The design of a system of this type thus requires a compromise that lowers its overall efficaciousness. As the diameter of the lens is increased, so the dichroic mirrors in the beam splitter must be larger to accommodate the increased beam size. A greater back focal distance is now required and the lens must be of larger focal length to provide space for the larger beam splitter. The same lens diameter of the new larger focal length now reflects a higher $f/$-number. Such a system is thus a compromise between focal length and $f/$-number.

Various other systems have been proposed for the image brightness problem, but they ordinarily involve a reduction of image size in order to increase its effective brightness. While these systems are satisfactory in some applications, they cannot be used in those applications where a 1:1 copy ratio is required, for example, if it is desired to use standard 16 mm. motion picture objective lenses with the currently standard vidicon tube.

According to the present invention, an optical system for color television cameras is provided which permits the use of a low $f/$-number system with standard lenses thus overcoming the aforementioned problems. An objective lens, which may be of any focal length or may be a "zoom" lens, forms an aerial image. A first relay lens system is focused on the aerial image in such a way that it is projecting this image to infinity. Additional relay lens systems are positioned relative to the television camera tubes such that a subject at infinity would form images coincident with their faces.

The distance between these lens systems can be varied to suit any structural arrangement without in any way affecting the focal length of the lens systems, and thus the camera designer has a maximum of freedom in positioning the beam splitter and associated mirrors, etc., between these lens systems and can thus best meet the structural requirements involved. The lenses may be of standard design and diameter as their focal lengths can be quite short, thereby enabling the systems to have low $f/$-numbers without necessitating the use of large dichroic mirrors.

A further advantage of introducing the dichroic mirrors or neutral mirrors into the collimated section of the light path lies in the elimination of "wedging" effects. This wedging effect is normally due to the insertion of a partial mirror into a converging or diverging beam of light with a consequent difference in the angle of incidence of the light path on the mirror from one side of the light beam to the other. The transmission of the partial mirror being largely dependent on the angle of incidence, density or color may shift across the area of the mirror. The optical system described herein avoids such shift.

Prior to the use of a color television camera to transmit an actual television program, it is generally focused on a reference and its output compared with the reference for color and/or registration accuracy. External charts are commonly used in current practice for this purpose, and these charts, while satisfactory, are inconvenient to use. The present invention therefore also provided a built-in reference system which eliminates the need for external aids.

It is therefore an object of the present invention to provide an improved optical system for a color television camera.

It is also an object of the present invention to provide a method of image separation for color television.

It is another object of the present invention to provide such a system utilizing lenses having low relative apertures.

It is a further object of the present invention to provide such a system wherein a beam splitter is positioned between a pair of low relative aperture lens systems.

It is a still further object of the present invention to provide such a system having a built-in reference for color and/or registration.

These and other objects and advantages of the present invention will become more apparent upon reference to the accompanying description and drawings in which.

Figure 1:
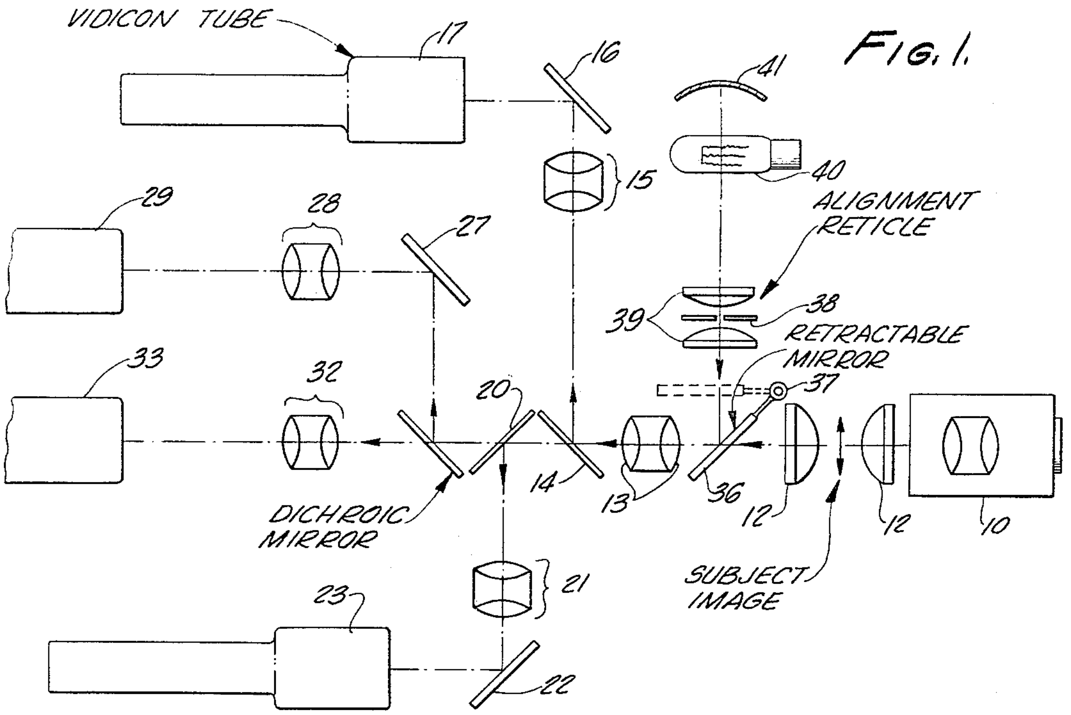
FIGURE 1 is a diagrammatic illustration of the optical system of the present invention.

Referring now to FIGURE 1, there is shown the optical system of the present invention. An objective lens 10, which may, for example, be a conventional zoom lens, forms a polychromatic aerial image of the subject at 11. Field lenses 12 may be provided on either side of the aerial image of 11 and have focal lengths such that they form an image of the aperture of the objective lens 10 at or beyond the relay lens or lens system 13 and serve to gather virtually all the light transmitted by the lens 10 and focus it into the aperture of the lenses 13, 15, 21, 28 and 32. If desired, a single field lens could be used, and the image 11 formed in a plane within the lens.

In certain geometrical configurations, and with certain focal lengths of objective lens 10, no field lens or lenses are required. In this instance a novel function of the first relay lens 13 may be observed. Its primary purpose is to project the aerial image at 11 to infinity, in certain configurations it will also image the aperture of objective lens 10, at the second relay lenses 15, 21, 28 and 32, thus eliminating the need for field lenses to avoid vignetting.

The lens 13 is a photographic objective lens and its distance from the aerial image 11 is such that it is projecting this image to infinity. This distance then, is approximately equal to the focal length of the lens 13. The beam of light passing through the lens 13 is next directed onto a neutral partial reflecting mirror 14. The mirror 14 deflects a portion of the beam through a second photographic objective lens 15. This beam of light is then reflected by a mirror 16 onto the face of a suitable television camera tube, for example, a vidicon tube 17.

The photographic objective lens 15 is positioned relative to the photosensitive face of the vidicon tube 17 such that a subject at infinity would form images in a plane coincident with this photo-sensitive face, i.e., its focal plane is coincident with this face. Since no color separation has yet taken place, the camera 17 serves as a black and white camera. The relative positions of lens 15 and mirror 16 could, of course, be reversed if desired for reasons of structural design.

The portion of the light beam undeflected by the mirror 14 is directed onto a first dichroic mirror 20. This mirror may reflect a wave length band of light of about 400 to 500 millimicrons (blue light) while transmitting the remaining wave length bands of light. The deflected beam passes through a photographic objective lens 21 similar to the lens 15 and is then reflected by a mirror 22 onto the face of a television camera tube 23, the lens 21 having its focal plane coincident with the face. The lens 21 thus acts to form a blue color separation image on the face of the camera tube 23.

The remaining wave lengths of light transmitted by the mirror 20 are next directed to a second dichroic mirror 26 which reflects wave length bands of light of about 600 to 700 millimicrons (red light) while transmitting the remaining wave length bands of light of approximately 500 to 600 millimicrons (green light). The red light reflected by the mirror 26 is directed onto another mirror 27 and then focused by the lens 28 onto the face of the television camera tube 29. The lens 28 is a photographic objective lens similar to the lenses 15 and 21 and serves to form a red color separation image on the photo-sensitive face of the television camera tube 29.

The green light transmitted by the mirror 26 passes through a photographic objective lens 32 similar to the lenses 15, 21 and 28 and is focused thereby onto the face of the television camera tube 33. A green image is thus formed on the photo-sensitive face of this camera tube. The dichroic mirrors 20 and 26 are extremely selective in the wave length bands that they reflect or transmit and thus sharp images of high brilliance are formed on each of the camera tubes.

In the optical system thus far described, the lenses 13, 15, 21, 28 and 32 are identical, all having the same focal length. It can thus be seen that a 1:1 copy ratio exists between the aerial image 11 and the images formed on the faces of the vidicon tubes 17, 23, 29 and 33. For systems requiring other copy ratios, the ratio of the focal lengths of the lens 13 and the lenses 15, 21, 28 and 32 would be precisely that of the copy ratio required. Since an infinity condition exists between the lens 13 and the other lenses, the distance between these lenses may be varied without affecting the focus of the image on the vidicon tubes. This feature greatly facilitates the design of a camera, as the designer can provide himself with as much space for the beam splitter as he feels necessary without having to worry about the effect on the focal length and relative apertures of the lenses. Moreover, the light path of each of the separated paths need not be identical, thus allowing even greater flexibility in design. Any number of mirrors may thus be used between the various lenses enabling the various paths to be folded to take the maximum advantage of the space available.

A built-in reference for color and/or registration is provided for selective insertion into the optical system of the television camera tubes. A reflecting mirror 36 is mounted so that it may be interposed between the aerial image 11 and the relay lens 13. The mirror 36 is shown in FIGURE 1 as pivotally mounted on a pin 37, but its preferred mounting will be described hereinafter in connection with FIGURES 2 and 3. The mirror 36 causes the relay lens 13 to be focused on a suitable alignment recticle 38 which is provided with suitable field lens 39 and illuminated by a lamp 40 having a reflector 41. The image of the reference alignment recticle is thus focused on the faces of the various camera tubes and the need for external color and registration reference charts eliminated.

Figure 2:
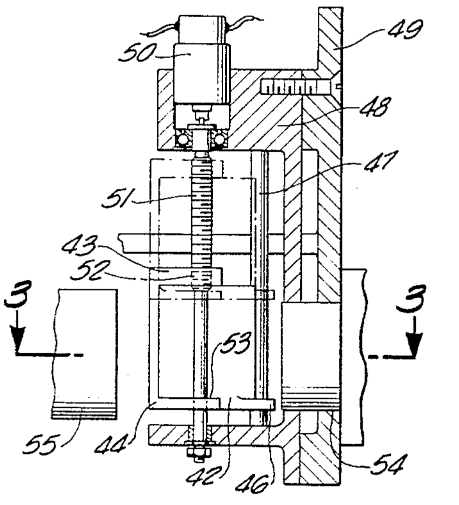
FIGURE 2 is a side elevation, partly in section, showing the structural details of a portion of the invention.
Figure 3:
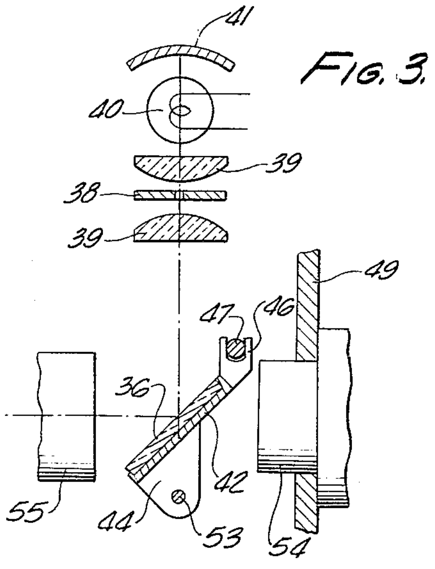
FIGURE 3 is a view, partly in section, taken along lines 3—3 of FIGURE 2.

In FIGURES 2 and 3 there is shown a preferred arrangement for interposing the mirror 36 into the optical system. As can be seen, the mirror 36 is mounted on a support 42 having a pair of horizontally extending flanges 43 and 44 and a bifurcated guide lug 45. The guide lug 45 cooperates with a guide post 47 which is mounted in a support 48 fastened to the front face of the camera housing 49. Also mounted in the support 48 is a reversible electric motor 50 operable to rotate a drive shaft having a threaded portion 51, the ends of which are suitably supported and journaled in the support 48.

The drive shaft portion 51 passes through a coopertatively threaded aperture 52 in the flange 43, the lower portion of the shaft passing through an aperture 53 in flange 44. Rotation of the drive shaft in a first direction thus causes the mirror support 42 and mirror 36 to be interposed between the cylinder 54 enclosing the field lenses 12 and the cylinder 55 enclosing the relay lens 13. Rotation of the drive shaft in the other direction results in the support 42 and mirror 36 being driven out of the optical path to the position shown in phantom in FIGURE 2. When in the lower position, the mirror 36 causes the relay lens 13 to focus on the alignment recticle 38 as pointed out previously.

From the foregoing description, it can be seen that an improved optical system has been provided for a color television camera. By projecting a polychromatic subject image to infinity by a relay lens and then using converging lenses to focus color separation representations of the projected image on a plurality of television camera tubes, design problems are greatly simplified as it is possible to use conventional lenses having low relative apertures. In this description and the accompanying claims, the words lens and lens system are used interchangeably as the particular characteristics desired may be obtained by using any of the lenses or lens combinations well known in the art. The convenience of the present optical system is further enhanced by the provision of a built-in color and/or registration reference which eliminates the need for external reference charts.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a color television camera:

an objective lens for forming a polychromatic aerial image of a subject;

a relay lens optically aligned with said aerial image and with said objective lens, said relay lens being spaced from said aerial image by a distance approximately equal to the focal length of said relay lens whereby said relay lens projects said aerial image to infinity, and being spaced from said objective lens so as to form an image of the aperture thereof;

a pair of partially reflecting mirrors positioned in the beam of light transmitted through said relay lens, said mirrors separating said beam into selected wave length bands of light;

a plurality of television camera tubes having photosensitive faces, a first of said tubes being optically aligned with the wave length band reflected by the first of said mirrors, a second of said tubes being optically aligned with the wave length band reflected by the second of said mirrors, and a third tube being optically aligned with the wave length band transmitted by both of said mirrors; and a plurality of focusing lenses associated with said mirrors, said tubes and said relay lens, each of said lenses being positioned in one of said bands of light between said mirrors and their associated television camera tubes, each lens being positioned relative to its respective camera tube to have its focal plane coincident with the sensitive face of said tube whereby color separation representations of said aerial image are formed on the faces of said tubes, each focusing lens further being positioned relative to said relay lens such that said image of said aperture of said objective lens is focused thereat.

2. The apparatus of claim 1 wherein said relay lens is the only optical element between said objective lens and said mirrors.

3. The apparatus of claim 2 wherein a neutral partially reflecting mirror is positioned between said relay lens and said mirrors to deflect a portion of said beam transmitted by said relay lens through a focusing lens onto the photosensitive face of a fourth television camera tube, said focusing lens being positioned relative to said tube to have its focal plane coincident with the sensitive face of said tube whereby a black and white representation of said aerial image is formed on the face of said tube.

4. The apparatus of claim 1 further provided with means optically insertable between said relay lens and said objective lens for providing a registration and color reference for said television camera tubes and their associated optical systems.

5. The apparatus of claim 4 wherein said means comprises a mirror which directs the image of an illuminated alignment or color reference reticle to said relay lens.

6. The apparatus of claim 4 wherein said mirror is driven between said relay lens and said objective lens by a reversible electric motor.

References Cited

UNITED STATES PATENTS

| | | | |
|---|---|---|---|
| 2,971,051 | 2/1961 | Back | 178—5.4 |
| 2,808,456 | 10/1957 | Wittel | 178—5.4 |
| 3,126,446 | 3/1964 | Blancha | 178—5.4 |
| 3,196,205 | 7/1965 | Bedford | 178—5.4 |
| 3,284,566 | 11/1966 | James et al. | 178—5.4 |
| 3,293,357 | 12/1966 | Doi et al. | 178—5.4 |

FOREIGN PATENTS

| | | |
|---|---|---|
| 860,336 | 1/1941 | France. |

ROBERT L. GRIFFIN, *Primary Examiner.*

DAVID G. REDINBAUGH, JOHN W. CALDWELL, *Examiners.*

J. A. O'BRIEN, R. MURRAY, *Assistant Examiners.*